(12) United States Patent
Lee et al.

(10) Patent No.: US 11,652,234 B2
(45) Date of Patent: May 16, 2023

(54) MICROCAPSULES, SEPARATOR COMPRISING SAME AND ELECTROCHEMICAL DEVICE COMPRISING SAME

(71) Applicant: LG CHEM, LTD., Seoul (KR)

(72) Inventors: Seung-Hyun Lee, Daejeon (KR);
Da-Kyung Han, Daejeon (KR);
Kwan-Woo Nam, Daejeon (KR);
Je-An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 715 days.

(21) Appl. No.: 16/637,613

(22) PCT Filed: May 14, 2019

(86) PCT No.: PCT/KR2019/005797
§ 371 (c)(1),
(2) Date: Feb. 7, 2020

(87) PCT Pub. No.: WO2019/221490
PCT Pub. Date: Nov. 21, 2019

(65) Prior Publication Data
US 2020/0168877 A1    May 28, 2020

(30) Foreign Application Priority Data

May 15, 2018   (KR) .................. 10-2018-0055666

(51) Int. Cl.
*H01M 10/052*   (2010.01)
*H01M 50/446*   (2021.01)
(Continued)

(52) U.S. Cl.
CPC .......... *H01M 10/052* (2013.01); *H01G 11/52* (2013.01); *H01M 10/4235* (2013.01);
(Continued)

(58) Field of Classification Search
None
See application file for complete search history.

(56) References Cited

U.S. PATENT DOCUMENTS

| 4,460,722 A * | 7/1984 | Igarashi | ........... B01J 13/20 |
| | | | 523/210 |
| 2003/0072996 A1 | 4/2003 | Roh | |

(Continued)

FOREIGN PATENT DOCUMENTS

| CN | 103579559 A | 2/2014 |
| CN | 103718336 A | 4/2014 |

(Continued)

OTHER PUBLICATIONS

Machine translation of KR 10-2017239 B1 (Year: 2019).*

(Continued)

*Primary Examiner* — Robert S Carrico
(74) *Attorney, Agent, or Firm* — Birch, Stewart, Kolasch & Birch, LLP

(57) ABSTRACT

A separator for an electrochemical device, including: a porous polymer substrate; and a porous coating layer formed on at least one surface of the porous polymer substrate and containing a plurality of microcapsules and a binder polymer positioned on the whole or a part of the surface of the microcapsules to connect and fix the microcapsules with one another, wherein the microcapsules include metal hydroxide particles, and capsule coating layer surrounding each surface of the metal hydroxide particles. An electrochemical device including the separator, and the microcapsules are also provided. The microcapsules and separator show excellent flame resistance and can reduce degradation of battery performance caused by water adsorbability of the plurality of a metal hydroxide particle.

8 Claims, 2 Drawing Sheets

(51) Int. Cl.
    *H01M 50/451*    (2021.01)
    *H01G 11/52*    (2013.01)
    *H01M 10/42*    (2006.01)
    *H01M 50/463*    (2021.01)
    *H01M 50/417*    (2021.01)

(52) U.S. Cl.
    CPC ....... *H01M 50/446* (2021.01); *H01M 50/451* (2021.01); *H01M 50/417* (2021.01); *H01M 50/463* (2021.01)

(56) References Cited

U.S. PATENT DOCUMENTS

| | | | |
|---|---|---|---|
| 2004/0086782 | A1 | 5/2004 | Zhang et al. |
| 2010/0173187 | A1* | 7/2010 | Nishikawa .......... H01M 50/431 |
| | | | 429/129 |
| 2014/0120402 | A1 | 5/2014 | Yu et al. |
| 2015/0179998 | A1* | 6/2015 | Kagami ................. H01M 4/13 |
| | | | 429/246 |
| 2015/0372277 | A1 | 12/2015 | Honda |
| 2016/0141581 | A1 | 5/2016 | Sasaki et al. |
| 2016/0226042 | A1 | 8/2016 | Hartmann et al. |
| 2018/0277815 | A1 | 9/2018 | Sung et al. |

FOREIGN PATENT DOCUMENTS

| | | |
|---|---|---|
| CN | 104289161 A | 1/2015 |
| CN | 105324868 A | 2/2016 |
| CN | 106861571 A | 6/2017 |
| JP | H11-228792 A | 8/1999 |
| KR | 10-0797222 B1 | 1/2008 |
| KR | 10-2010-0001283 A | 1/2010 |
| KR | 10-0975738 B1 | 8/2010 |
| KR | 10-2013-0116992 A | 10/2013 |
| KR | 10-2015-0040103 A | 4/2015 |
| KR | 10-2015-0072338 A | 6/2015 |
| KR | 10-2015-0129669 A | 11/2015 |
| KR | 10-2016-0130716 A | 11/2016 |
| KR | 10-2017-0007210 A | 1/2017 |
| KR | 10-2017-0017141 A | 2/2017 |
| KR | 10-2017-0108156 A | 9/2017 |
| WO | WO 03/090291 A2 | 10/2003 |

OTHER PUBLICATIONS

European Patent Office Search Report dated Nov. 30, 2020 for EP Application No. 19804015.6.
International Search Report (PCT/ISA/210) issued in PCT/KR2019/005797, dated Aug. 27, 2019.

* cited by examiner

MICROCAPSULES, SEPARATOR COMPRISING SAME AND ELECTROCHEMICAL DEVICE COMPRISING SAME

TECHNICAL FIELD

The present disclosure relates to microcapsules for an electrochemical device, a separator including the microcapsules and applicable to an electrochemical device, such as a lithium secondary battery, and an electrochemical device including the separator.

The present application claims priority to Korean Patent Application No. 10-2018-0055666 filed on May 15, 2018 in the Republic of Korea, the disclosures of which including the specification and drawings are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a positive electrode and a negative electrode.

To solve the above-mentioned safety problems of an electrochemical device, there has been suggested a separator having a porous organic-inorganic coating layer formed by applying a mixture of an excessive amount of inorganic particles and a binder polymer onto at least one surface of a porous polymer substrate having a plurality of pores.

DISCLOSURE

Technical Problem

The present disclosure is designed to solve the problems of the related art, and therefore the present disclosure is directed to providing microcapsules for an electrochemical device which can provide a moisture-reducing effect and improved battery performance.

The present disclosure is also directed to providing a separator for an electrochemical device including the microcapsules and an electrochemical device including the separator.

It will be easily understood that these and other objects and advantages of the present disclosure may be realized by the means shown in the appended claims and combinations thereof.

Technical Solution

In one aspect of the present disclosure, there are provided microcapsules for an electrochemical device according to any one of the following embodiments.

According to the first embodiment, there are provided microcapsules for an electrochemical device, including metal hydroxide particles, and a capsule coating layer surrounding each surface of the metal hydroxide particle, wherein the capsule coating layer includes a flame resistant resin, and the metal hydroxide particles include at least one selected from the group consisting of aluminum hydroxide, calcium hydroxide, and boehmite.

According to the second embodiment, there are provided microcapsules for an electrochemical device as defined in the first embodiment, wherein the metal hydroxide particle includes aluminum hydroxide.

According to the third embodiment, there are provided microcapsules for an electrochemical device as defined in the first or the second embodiment, wherein the flame resistant resin includes a melamine resin.

According to the fourth embodiment, there are provided microcapsules for an electrochemical device as defined in the first embodiment, wherein the melamine resin includes at least one selected from the group consisting of melamine, melamine cyanurate, melamine isocyanurate, triphenyl isocyanurate, melamine phosphate, and melamine pyrophosphate.

According to the fifth embodiment, there are provided microcapsules for an electrochemical device as defined in any one of the first to the fourth embodiments, wherein the microcapsule further includes phosphoric acid.

According to the sixth embodiment, there are provided microcapsules for an electrochemical device as defined in the any one of the first to the fifth embodiments, wherein the capsule coating layer is present in an amount of 1 to 5 parts by weight based on 100 parts by weight of the metal hydroxide particles.

According to the seventh embodiment, there are provided microcapsules for an electrochemical device as defined in any one of the first to the sixth embodiments, wherein the capsule coating layer is present in an amount of 1 to 3 parts by weight based on 100 parts by weight of the metal hydroxide particles.

In another aspect of the present disclosure, there is also provided a separator for an electrochemical device according to any one of the following embodiments.

According to the eighth embodiment, there is provided a separator for an electrochemical device, including:

a porous polymer substrate; and a porous coating layer formed on at least one surface of the porous polymer substrate, wherein the porous coating layer comprises a plurality of microcapsules and a binder polymer positioned on a whole or a part of a surface of the microcapsules to connect and fix the microcapsules with one another, wherein the microcapsules are the microcapsules for an electrochemical device as defined in any one of the first to the seventh embodiments.

According to the ninth embodiment, three is provided the separator for an electrochemical device as defined in the eighth embodiment, wherein a weight ratio of the microcapsules to the binder polymer is 60:40 to 99:1.

In still another aspect of the present disclosure, there is also provided an electrochemical device according to any one of the following embodiments.

According to the tenth embodiment, there is provided an electrochemical device including a positive electrode, a negative electrode and a separator interposed between the positive electrode and the negative electrode, wherein the separator is the separator for an electrochemical device as defined in the eighth embodiment.

According to the eleventh embodiment, there is provided the electrochemical device as defined in the tenth embodiment, which is a lithium secondary battery.

Advantageous Effects

According to an embodiment of the present disclosure, it is possible to provide a separator for an electrochemical device having excellent flame resistance by using a porous coating layer containing metal hydroxide particles.

According to an embodiment of the present disclosure, it is possible to reduce degradation of the battery performance caused by moisture adsorbability of metal hydroxide particles by coating the metal hydroxide particles with the flame resistant resin.

According to an embodiment of the present disclosure, it is possible to provide an electrochemical device having improved cycle characteristics by using the separator.

BEST MODE

Figure 1:
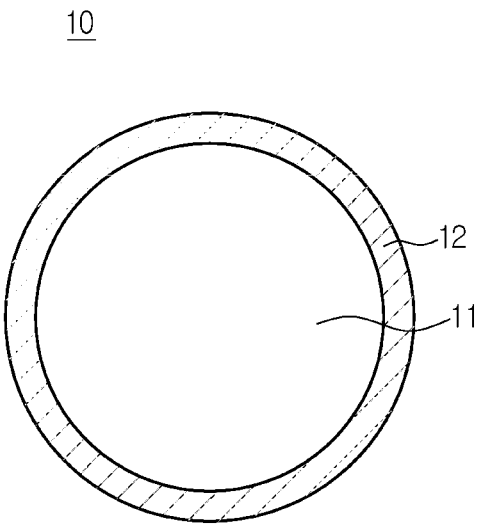
FIG. 1 is a schematic view illustrating the microcapsule according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Throughout the specification, the expression 'a part [includes] an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to microcapsules for an electrochemical device, a separator including the microcapsules and an electrochemical device including the same.

In an electrochemical device, such as a lithium secondary battery, a separator may undergoes heat shrinking at high temperature to cause a short-circuit between a positive electrode and a negative electrode.

To prevent such heat shrinking, conventional separators include a porous organic-inorganic coating layer containing inorganic particles and a binder polymer.

However, such a porous coating layer containing inorganic particles still shows poor safety.

Therefore, according to the present disclosure, metal hydroxide particles are used instead of inorganic particles, such as alumina, used according to the related art. It is possible to increase a flame retardant effect and to improve battery safety by using the metal hydroxide particles.

However, it has been found that such metal hydroxide shows high moisture adsorbability, but a trace amount of moisture adsorbed by the metal hydroxide may react with an electrolyte salt, such as $LiPF_6$, to produce HF, and then the produced HF may adversely affect battery performance, and particularly causes degradation of cycle characteristics of the battery.

To solve the above-mentioned problem, according to an embodiment of the present disclosure, there are provided microcapsules for an electrochemical device, including metal hydroxide particles, and capsule coating layers surrounding the surfaces of the metal hydroxide particles, wherein the capsule coating layer includes a flame resistant resin.

Hereinafter, the present disclosure will be explained in detail with reference to FIG. 1.

The microcapsules 10 for an electrochemical device according to an embodiment of the present disclosure include metal hydroxide particles 11, and the metal hydroxide particles are surrounded with capsule coating layers 12 including a flame resistant resin. In other words, the microcapsule according to the present disclosure has a core-shell structure which includes a metal hydroxide particle at the core portion thereof and a flame resistant resin at the shell portion thereof. As used herein, the term 'shell portion' means a portion surrounding a core portion completely so that the surface of the core portion may not be exposed to the outside and any vacant space may not be formed.

Since the metal hydroxide particle 11 has a hydroxyl group in its molecular structure, it can adsorb moisture present in the air with ease through hydrogen bonding, or the like. However, in an electrochemical device, such as a lithium secondary battery, the absorbed moisture may react with a lithium salt to produce hydrogen fluoride, which causes the problem of degradation of battery performance, such as cycle characteristics.

According to the present disclosure, the surface of metal hydroxide particle 11 is coated with the capsule coating layer 12 to solve the above-mentioned problem.

As used herein, the term 'metal hydroxide particle' includes a particle having a cationic metal ion and an anionic hydroxide ion (OH), provided with flame resistance, and present in a solid state at room temperature.

According to the present disclosure, the metal hydroxide particle includes aluminum hydroxide ($Al(OH)_3$), calcium hydroxide, boehmite ($AlO(OH)$) or a mixture of two or more of them.

Particularly, aluminum hydroxide particles are preferred. Aluminum hydroxide particles absorb heat at a temperature of about 200-250° C. to so that they may be decomposed into alumina ($Al_2O_3$) and water ($H_2O$), wherein a heat energy of about 1000 J/g is absorbed. Therefore, in the case of a lithium secondary battery, aluminum hydroxide particles are more preferred as inorganic particles used for a porous coating layer, as compared to magnesium hydroxide that may be decomposed into magnesium oxide and water through heat absorption at a temperature of 350° C. or higher. In other words, when using aluminum hydroxide particles, it is possible to further enhance the safety of an electrochemical device.

In addition, aluminum hydroxide-flame resistant resin composite particles including aluminum hydroxide particles at the core portions thereof and a flame resistant resin at the shell portions thereof can contribute to improvement of safety, since the flame resistant resin surrounding the core portions interrupts reaction with water generated during the operation of an electrochemical device and prevents the problems that may occur due to decomposition of aluminum hydroxide into water.

According to the present disclosure, the capsule coating layer 12 includes a flame resistant resin.

As used herein, the term 'flame resistant resin' means a resin having flame resistance, wherein flame resistance inhibits combustion to delay or interrupt combustion so that a material itself may have improved ability of tolerating flame or high temperature. Particularly, flame resistance increases the ignition point and lowers combustion rate of a material so that the material may not be fired easily. The flame resistant resin according to the present disclosure means a material coated totally on the surface of the metal hydroxide particles to prevent moisture adsorption.

According to an embodiment of the present disclosure, the flame resistant resin may include a nitrogen-based flame retardant.

According to an embodiment of the present disclosure, the nitrogen-based flame retardant may include a melamine resin.

According to an embodiment of the present disclosure, the melamine resin may include melamine, melamine cyanurate, melamine isocyanurate, triphenyl isocyanurate, melamine phosphate, melamine pyrophosphate, or a mixture of two or more of them.

According to an embodiment of the present disclosure, the capsule coating layer may further include phosphoric acid. Phosphoric acid functions as a reactivity-enhancing agent and/or catalyst. According to an embodiment of the present disclosure, phosphoric acid may be used in an amount of 1-5 parts by weight based on 100 parts by weight of metal hydroxide particles.

According to an embodiment of the present disclosure, the capsule coating layer may be present in an amount of 1-5 parts by weight, or 1-3 parts by weight, based on 100 parts by weight of metal hydroxide particles. The capsule coating layer interrupts the metal hydroxide particles from being in direct contact with water.

According to an embodiment of the present disclosure, the flame resistant resin may be a hydrophilic resin.

In general, as the thickness of a hydrophobic capsule coating layer is increased, the ability of interrupting moisture generated in the core is increased to generate a smaller amount of moisture. However, a hydrophilic material is used as a flame resistant resin instead of a hydrophobic material, according to the present disclosure. Thus, as the content of capsule coating layer is decreased, the amount of moisture adsorption or moisture generation may be reduced. It is thought that this is because a hydrophilic flame resistant resin can adsorb a larger amount of moisture.

According to an embodiment of the present disclosure, the microcapsule may be obtained by the following method, but the scope of the present disclosure is not limited thereto.

First, metal hydroxide particles, such as aluminum hydroxide particles, are dispersed in water and phosphoric acid is added thereto. Next, a melamine resin is added and the resultant mixture is agitated so that the surface of metal hydroxide particles may be coated with melamine.

In another aspect of the present disclosure, there is provided a separator including the above-described microcapsule.

According to an embodiment of the present disclosure, the separator includes:

a porous polymer substrate; and a porous coating layer formed on at least one surface of the porous polymer substrate and containing a plurality of microcapsules and a binder polymer positioned on the whole or a part of the surface of the microcapsules to connect the microcapsules with one another and fix them.

According to an embodiment of the present disclosure, a polymer used conventionally for forming a porous coating layer may be used as the binder polymer. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes microcapsules with one another, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 MPa$^{1/2}$ or 15-25 MPa$^{1/2}$ and 30-45 MPa$^{1/2}$. Therefore, hydrophilic polymers having many polar groups may be used more frequently as compared to hydrophobic polymers, such as polyolefins. When the solubility parameter is less than 15 MPa$^{1/2}$ and more than 45 MPa$^{1/2}$, it is difficult for the binder polymer to be swelled with a conventional liquid electrolyte for a battery.

Non-limiting examples of the binder polymer include but are not limited to: polyvinylidene fluoride, polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, carboxymethyl cellulose and tannic acid. Such binder polymers may be used alone or in combination.

According to an embodiment of the present disclosure, the microcapsule may include the capsule coating layer in an amount of 1-5 parts by weight, or 1-3 parts by weight, based on 100 parts by weight of the metal hydroxide particles.

When the content of the capsule coating layer is within the above-defined range, it is possible to reduce or interrupt moisture generated from the metal hydroxide particles.

According to an embodiment of the present disclosure, the weight ratio of the microcapsules to the binder polymer may be 60:40-99:1, or 70:30-99:1. When the weight ratio of the microcapsules to the binder polymer satisfies the above-defined range, it is possible to prevent the problem of a decrease in pore size and porosity of the resultant porous coating layer, caused by an increase in content of the binder polymer. It is also possible to solve the problem of degradation of peeling resistance of the porous coating layer, caused by a decrease in content of the binder polymer.

According to an embodiment of the present disclosure, the porous coating layer may further include other additives besides the microcapsules and binder polymer as described above.

The thickness of the porous coating layer is not particularly limited, but the porous coating layer formed on one surface of the porous polymer substrate may have a thickness of 1-10 μm, particularly 1.5-6 μm. When the porous coating layers are formed on both surfaces of the porous polymer substrate, the total thickness of the porous coating layers may be 2-20 μm, particularly 3-12 μm.

In addition, the porosity of the porous coating layer is not particularly limited but may be 35-65% preferably.

In the separator according to the present disclosure, the porous polymer substrate may be a porous polymer film substrate or porous polymer nonwoven web substrate.

The porous polymer film substrate may include a porous polymer film made of polyolefin, such as polyethylene or polypropylene. For example, such a polyolefin porous polymer film substrate shows a shut-down function at a temperature of 80-130° C.

Herein, particular examples of the polyolefin porous polymer film may include those formed of polymers including polyethylene, such as high-density polyethylene, linear low-density polyethylene, low-density polyethylene and ultrahigh-molecular weight polyethylene, polypropylene, polybutylene and polypentene, alone or in combination.

Additionally, the porous polymer film substrate may be obtained by molding various polymers, such as polyester, other than polyolefin into a film shape. Further, the porous polymer film substrate may have a laminate structure having two or more film layers stacked successively, wherein each film layer may include the above-mentioned polymers, such as polyolefin or polyester, alone or in combination.

In addition to the polyolefin-based porous polymer film substrate and porous nonwoven web substrate, the substrate may include those formed of polymers including polyethylene terephthalate, polybutylene terephthalate, polyester, polyacetal, polyamide, polycarbonate, polyimide, polyetherether ketone, polyether sulfone, polyphenylene oxide, polyether sulfone, polyphenylene oxide, polyphenylene sulfide, polyethylene naphthalene, or the like, alone or in combination.

The thickness of the porous polymer substrate is not particularly limited but may be 1-100 μm, particularly 5-50 μm. In addition, the size of pores present in the porous polymer substrate and the porosity are not particularly limited. However, the pore size and porosity may be 0.01-50 μm and 10-95%, respectively.

The separator according to an embodiment of the present disclosure may be obtained by the method used conventionally in the art. According to an embodiment of the present disclosure, slurry for forming a porous coating layer, including microcapsules dispersed in a polymer dispersion containing a binder polymer dispersed in a solvent, may be applied to and dried on a porous polymer substrate to form a porous coating layer. The porous coating layer may be formed by using a slot coating or dip coating process, but is not limited thereto. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous polymer substrate coated with the composition for forming a porous coating layer is dried by using a dryer, such as an oven, to form a porous coating layers on at least one surface of the porous polymer substrate.

In the porous coating layers, the microcapsules are bound with one another by the binder polymer while they are packed and are in contact with one another. Thus, interstitial volumes are formed among the microcapsules and the interstitial volumes become vacant spaces to form pores.

In other words, the binder polymer attaches the microcapsules to each other so that they may retain their binding states. For example, the binder polymer connects and fixes the microcapsules with one another. In addition, the pores of the porous coating layer are those formed by the interstitial volumes among the microcapsules which become vacant spaces. The space may be defined by the microcapsules facing each other substantially in a closely packed or densely packed structure of the microcapsules.

In still another aspect of the present disclosure, there is provided an electrochemical device including a positive electrode, a negative electrode and a separator interposed between the positive electrode and negative electrode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, positive electrode and negative electrode, used in combination with the separator according to the present disclosure are not particularly limited, and may be obtained by allowing an electrode active material to be bound to an electrode current collector through a method generally known in the art. Among the electrode active materials, non-limiting examples of a positive electrode active material include conventional positive electrode active materials that may be used for the positive electrodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of a negative electrode active material include conventional negative electrode active materials that may be used for the negative electrodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a positive electrode current collector include foil made of aluminum, nickel or a combination thereof. Non-limiting examples of a negative electrode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (g-butyrolactone) or a mixture thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLE 1

Preparation of Microcapsule

First, aluminum hydroxide ($Al(OH)_3$) particles ($D_{50}$, 0.9 μm) as metal hydroxide particles were dispersed in an amount of 30 parts by weight based on 100 parts by weight of distilled water to obtain a dispersion of metal hydroxide particles containing aluminum hydroxide particles dispersed in distilled water. Next, phosphoric acid and melamine as a flame resistant resin were added thereto in an amount of 1.5 parts by weight and 10 parts by weight, respectively, based on 100 parts by weight of aluminum hydroxide particles. Then, the resultant mixture was agitated at 70° C. for 12 hours and washed with acetone to obtain microcapsules for an electrochemical device having a final particle size of 1.0 μm ($D_{50}$) and including 1 part by weight of capsule coating layers based on 100 parts by weight of aluminum hydroxide particles.

(2) Manufacture of Separator

At room temperature, the microcapsules obtained as described above, the first binder polymer (cyanoethylpullulan), the second binder polymer (tannic acid) and the third binder polymer (polyvinylidene fluoride, PVDF) were dissolved in acetone at a weight ratio of 70:1:1:28 to prepare slurry for forming a porous coating layer. Herein, the microcapsules were added to the slurry in an amount of 18 parts by weight based on 100 parts by weight of acetone.

The slurry for forming a porous coating layer was applied to both surfaces of a polyethylene porous substrate having a thickness of 9 μm by using a dip coating process, followed by drying, to form a porous coating layer. Each porous coating layer had a thickness of 4 μm.

(3) Manufacture of Positive Electrode

A positive electrode active material ($LiCoO_2$), a conductive material (carbon black) and a binder polymer (polyvinylidene fluoride) were introduced to N-methyl-2-pyrrolidone (NMP) at a weight ratio of 96:1.5:2.5, followed by mixing, to prepare slurry. The resultant slurry was coated onto aluminum foil having thickness of 30 μm to a capacity of 3.285 mAh/cm² to obtain a positive electrode.

(4) Manufacture of Negative Electrode

A negative electrode active material (graphite), a conductive material (carbon black), carboxymethyl cellulose (CMC) and a binder polymer (styrene butadiene rubber, SBR) were mixed with water at a weight ratio of 96:2.5:1.5:1 to prepare slurry. The resultant slurry was coated on copper foil having a thickness of 8 μm to obtain a negative electrode having a thickness of 50 μm.

(5) Manufacture of Lithium Secondary Battery

First, $LiPF_6$ was dissolved in an organic solvent including ethylene carbonate (EC) mixed with propylene carbonate (PC) at a volume ratio of 1:1 to a concentration of 1.0 M, thereby providing a non-aqueous electrolyte.

The separator was interposed between the positive electrode and the negative electrode obtained as described above, and the resultant structure was pressed at 90° C. under 8.5 MPa for 1 second to obtain an electrode assembly. The electrode assembly was received in a pouch casing and the electrolyte was injected thereto to obtain a lithium secondary battery.

EXAMPLE 2

A lithium secondary battery was obtained in the same manner as Example 1, except that the content of the flame resistant resin introduced to the particle dispersion was controlled to obtain microcapsules for an electrochemical device including 3 parts by weight of capsule coating layers based on 100 parts by weight of aluminum hydroxide particles.

EXAMPLE 3

A lithium secondary battery was obtained in the same manner as Example 1, except that the content of the flame resistant resin introduced to the particle dispersion was controlled to obtain microcapsules for an electrochemical device including 5 parts by weight of capsule coating layers based on 100 parts by weight of aluminum hydroxide particles.

COMPARATIVE EXAMPLE 1

A separator and a lithium secondary battery including the same were obtained in the same manner as Example 1, except that aluminum hydroxide particles ($Al(OH)_3$) ($D_{50}$, 0.9 μm) were used as they were, instead of the microcapsules.

COMPARATIVE EXAMPLE 2

A separator and a lithium secondary battery including the same were obtained in the same manner as Example 3, except that aluminum hydroxide particles ($Al(OH)_3$) ($D_{50}$, 0.9 μm) were used as they were, instead of the microcapsules.

COMPARATIVE EXAMPLE 3

A separator and a lithium secondary battery including the same were obtained in the same manner as Example 1, except that magnesium hydroxide particles were used instead of aluminum hydroxide particles.

TEST EXAMPLES

1) Method for Evaluating Moisture Absorption

Figure 2:
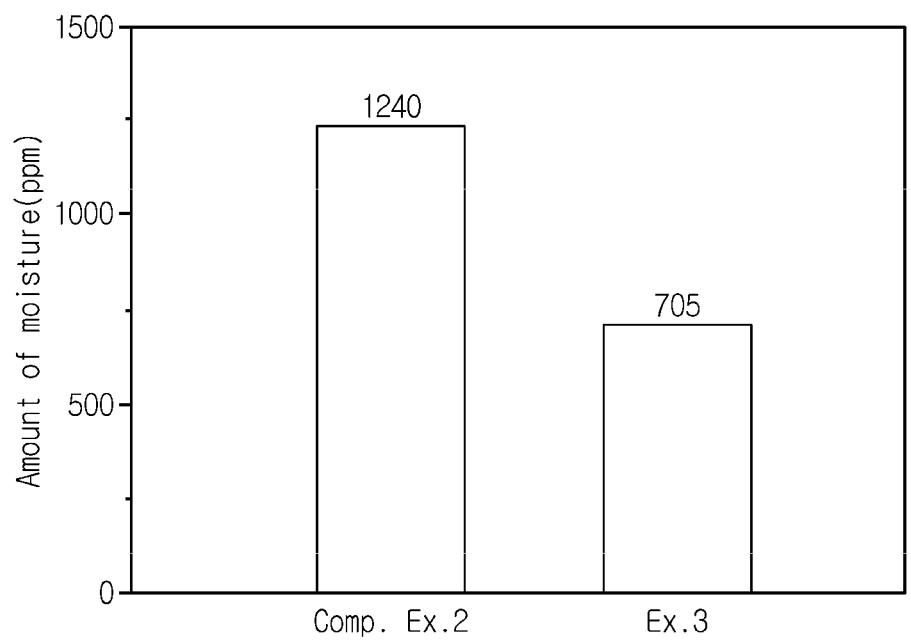
FIG. 2 is a graph illustrating the moisture content of the microcapsule according to an embodiment of the present disclosure and that of the aluminum hydroxide particles according to Comparative Example.
Figure 3:
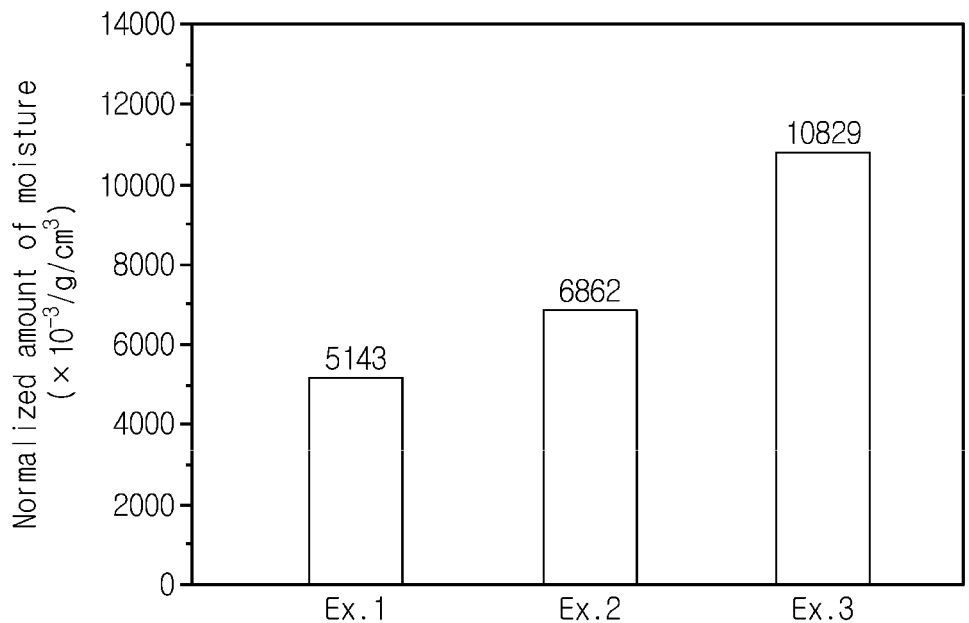
FIG. 3 shows the moisture content of the microcapsule according to an embodiment of the present disclosure.

Each of the microcapsules according to Examples and Comparative Examples was sampled at a weight of 0.1 g and dried in a dry room for 2 days. Then, a moisture content measurement system (Karl Fischer 860, Metrohm) was used to determine the moisture absorption under the conditions of 120° C. and a $N_2$ flow rate of 60 mL/min. The results are shown in FIGS. 2 and 3. Referring to FIG. 2, the microcapsules according to Example 3 include the aluminum hydroxide particles according to Comparative Example 2, the surfaces of which were coated with capsule coating layers including a flame resistant resin. Thus, it can be seen that Example 3 shows significantly reduced moisture absorption. The metal hydroxide particle itself, not coated with a capsule coating layer, like Comparative Example 2, shows high moisture adsorbability, and thus may cause degradation of cycle characteristics due to the moisture generation in a battery during the operation of the battery.

Meanwhile, referring to FIG. 3, it can be seen that Example 1 having the lowest capsule coating layer content shows the smallest moisture absorption or generation, as compared to Example 3 having a higher capsule coating layer content.

2) Method for Evaluating Cycle Characteristics

Figure 4:
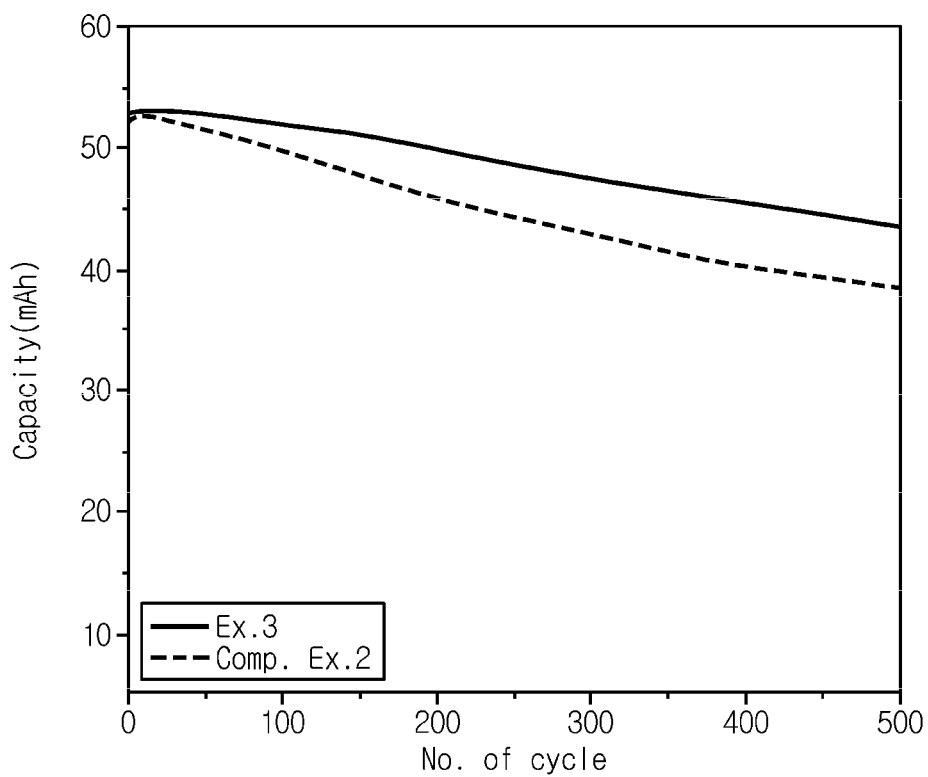
FIG. 4 is a graph illustrating the cycle characteristics of the lithium batteries according to and embodiment of the present disclosure and Comparative Example.

Each of the lithium secondary batteries according to Example 3 and Comparative Example 2 was charged at room temperature to 4.25V at 0.3 C in a constant current-constant voltage (CC-CV) mode and discharged to 3V at 0.5 C in a constant current mode. The charge/discharge cycles were repeated to 500 times to determine capacity retention. The results are shown in FIG. 4. Referring to FIG. 4, it can be seen that the lithium secondary battery according to Example 3 using the separator provided with a porous coating layer including the microcapsules causes significantly reduced degradation of battery performance caused by moisture adsorbability of metal hydroxide particles, even after repeating 500 cycles, as compared to Comparative Example 2.

What is claimed is:

1. A separator for an electrochemical device, comprising:
a porous polymer substrate; and
a porous coating layer formed on at least one surface of the porous polymer substrate,
wherein the porous coating layer comprises a plurality of microcapsules and a binder polymer positioned on a whole or a part of a surface of the microcapsules to connect and fix the microcapsules with one another,
wherein the microcapsules comprise metal hydroxide particles, and a capsule coating layer surrounding each surface of the metal hydroxide particles,
wherein the capsule coating layer comprises a flame resistant resin, and
the metal hydroxide particles comprise aluminum hydroxide,
wherein the capsule coating layer is present in an amount of 1 to 5 parts by weight based on 100 parts by weight of the metal hydroxide particles.

2. The separator for the electrochemical device according to claim 1, wherein the flame resistant resin comprises a melamine resin.

3. The separator for the electrochemical device according to claim 2, wherein the melamine resin comprises at least one selected from the group consisting of melamine, melamine cyanurate, melamine isocyanurate, triphenyl isocyanurate, melamine phosphate, and melamine pyrophosphate.

4. The separator for the electrochemical device according to claim 1, wherein the microcapsule further comprises phosphoric acid.

5. The separator for the electrochemical device according to claim 1, wherein the capsule coating layer is present in an amount of 1 to 3 parts by weight based on 100 parts by weight of the metal hydroxide particles.

6. The separator for the electrochemical device according to claim 1, wherein a weight ratio of the microcapsules to the binder polymer is 60:40 to 99:1.

7. An electrochemical device, comprising:
a positive electrode,
a negative electrode and
the separator according to claim 1 interposed between the positive electrode and the negative electrode.

8. The electrochemical device according to claim 7, which is a lithium secondary battery.

* * * * *